United States Patent [19]
Laing

[11] 3,814,963
[45] June 4, 1974

[54] STATOR FOR ROTATING ELECTRICAL MACHINES

[76] Inventor: Nikolaus Laing, Hofener Weg 35 bis 37, 7141 Aldingen near Stuttgart, Germany

[22] Filed: Sept. 8, 1972

[21] Appl. No.: 287,266

[30] Foreign Application Priority Data
Sept. 17, 1971 Austria ............................. 8081/71

[52] U.S. Cl.................. 310/217, 310/166, 310/254
[51] Int. Cl. ........................................... H02k 1/06
[58] Field of Search............ 310/157, 166, 190–193, 310/254–259, 216–218

[56] References Cited
UNITED STATES PATENTS
1,444,495  2/1923  Coleman......................... 310/217 X
2,484,001  10/1949  Raymond........................... 310/254
2,487,846  11/1949  Boelsums.......................... 310/254
2,932,752  4/1960  Jones et al. ........................ 310/166
3,581,132  5/1971  Laing............................. 310/193 X Primary Examiner—D. F. Duggan
Attorney, Agent, or Firm—Pennie & Edmonds

[57] ABSTRACT

In a stator for rotating electrical machines, whose pole teeth extend parallel to the axis of the rotor, the ends of the teeth are, in the region of the rotor, so joined to each other by connecting elements of magnetically non-conducting material, that distortion of the stator in a radial direction as well as cracking of the teeth during the operation of the machine are prevented.

10 Claims, 7 Drawing Figures

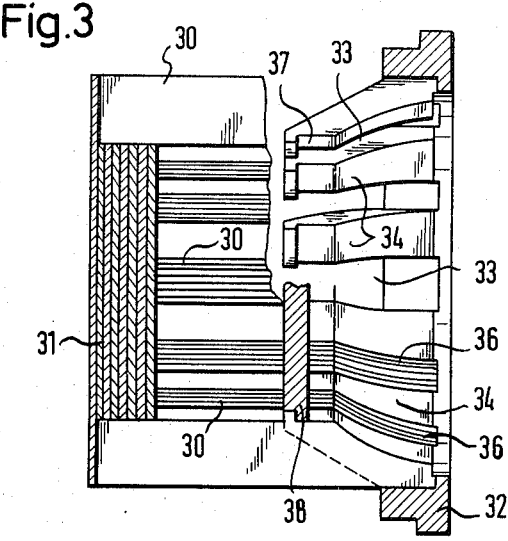
Fig.3
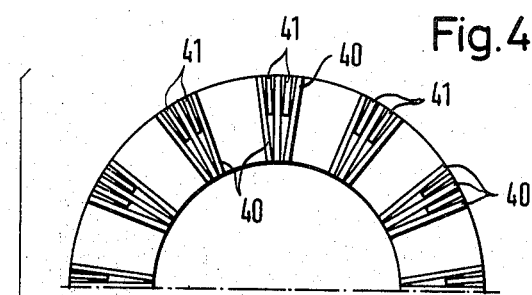
Fig.4a
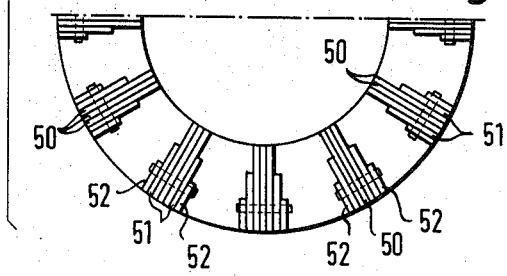
Fig.4b
Fig.4

STATOR FOR ROTATING ELECTRICAL MACHINES

STATE OF THE ART

Stators for induction motors with pole teeth extending parallel to the axis of the rotor and having a spherical air gap are known. By contrast to axial split motors, the magnetic forces transmitted from the stator to the rotor have radial components of force which cause the pole teeth of the stators to be exposed to distorting forces, which vary according to the supply frequency. The vibrations of the pole teeth thereby produced create an irritating hum, which considerably restricts the possible applications of such motors.

THE OBJECT OF THE INVENTION

It is an object of the invention, to eliminate this hum without adversely affecting the economics and the simple construction of spherical motors.

DESCRIPTION OF THE INVENTION

The invention relates to a stator for rotating electrical machines whose pole teeth extend parallel to the axis of the rotor with the pole teeth being joined together in a magnetically conducting manner at those of their ends which face away from the rotor and where the region of the free ends of the teeth which face the rotor bound in part an air gap with the armature. The invention is considered to reside in the feature that adjacent teeth in the terminal region of their free ends are joined together by connecting elements of magnetically non-conducting material. The invention thus eliminates humming to a large extent by not only securing the teeth by means of the return path element at the end facing away from the rotor, but also by a further disc- or ring-shaped element in the direct vicinity of the rotor. Thereby any bending and distortion of the teeth is prevented and it has been found that this has an extremely beneficial effect on noise production.

The invention will be explained, by way of example, with reference to the figures:

FIG. 1 shows a sectional view of a stator for a rotating electrical machine with a spherical rotor in accordance with the invention, on the line 1—1 in FIG. 1a.

FIG. 3 shows, in a similar sectional view to FIGS. 1 and 2, a stator in accordance with the invention with a connecting element in the form of an annular insert, and FIGS. 4a and 4b show diagrammatically in plan views the constructions of two different kinds of pole tooth, assembled from sheet metal sections of equal thickness.

Figure 1:
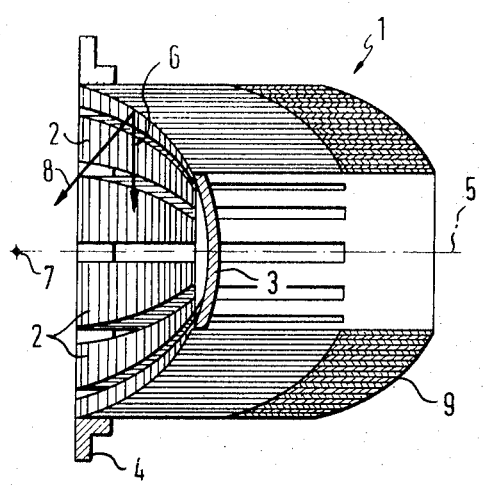
Figure 1A:
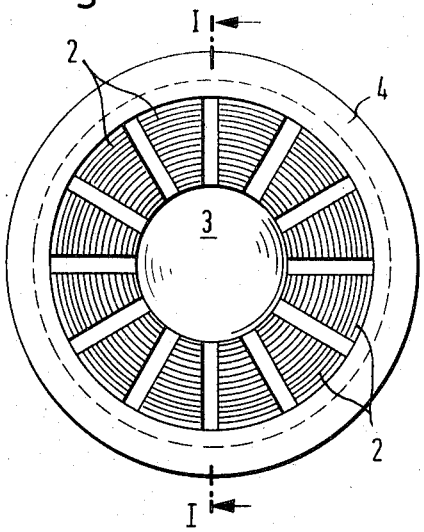
FIG. 1a shows a plan of the stator shown in FIG. 1.

FIG. 1 shows a stator 1, whose pole ring is made from a spirally wound sheet metal strip. The teeth 2 of the stator are supported at their ends on the rotor side by a plate 3 of non-magnetic material. Since magnetically repulsive forces may also create noise producing distortions, there is further provided in accordance with the invention a ring 4 which prevents the teeth 2 from moving apart. By these means the component 6 of the magnetic force component 8 directed to the centre 7 of the spherical rotor, which is radial to the axis of rotation 5, is prevented from causing the teeth to vibrate radially. At those of their ends remote from the rotor (not shown), the teeth are inter-connected in a magnetically conducting manner by means of the return path 9.

Figure 2:
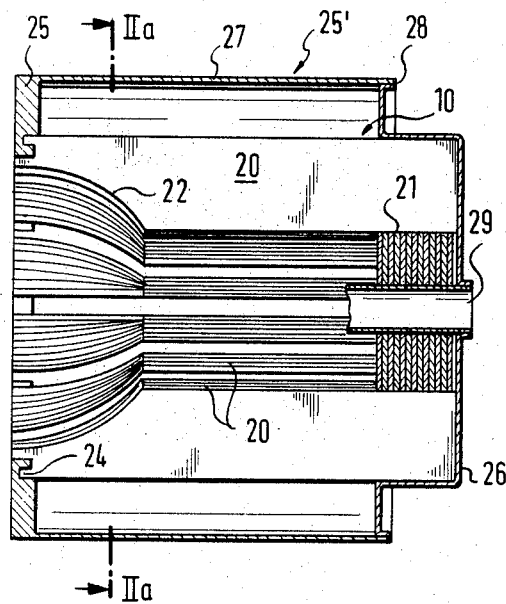
FIG. 2 shows, in section on the line II—II in FIG. 2a, a further embodiment of a stator according to the invention, enclosed in a housing.
Figure 2A:
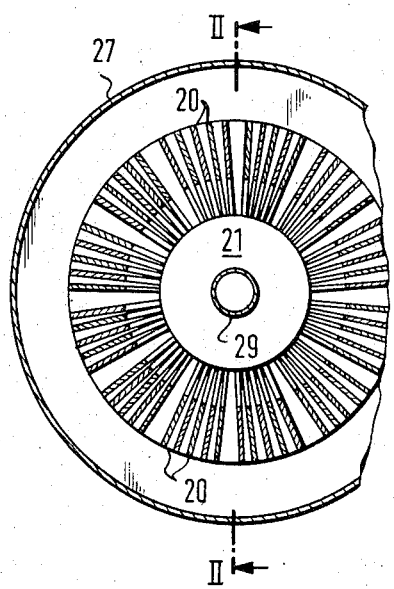
FIG. 2a shows a section on the line IIa—IIa in FIG. 2.

FIG. 2 shows another stator 10, whose pole ring consists of radially disposed sheet metal strips 20, which between them enclose at one end a plurality of circular sheet metal strips 21 defining a magnetic return path and which along the line 22 at their free ends form the magnetic gap with the rotor (not shown). A ring 25 of magnetically non-conducting material, which secures the sheet metal strips 20 against radially inward as well as radially outward movement, is inserted in grooves 24. In accordance with the invention this sheet metal ring 25 may at the same time form part of the motor housing 25'. A cap 26, consisting preferably of electrically conducting material, since in that case it provides at the same time the magnetic return path, serves to prevent radially outward vibration of the sheet metal strips 20 at their ends remote from the rotor. This cap may be rigidly joined to the cylindrical housing wall 27 at 28. If furthermore a spherical separating element (not shown) inserted in the air gap is sealingly connected to the ring 25, and a tube 29 is in turn inserted in the centre of this element, the winding space of the stator is hermetically surrounded by housing on all sides.

In the embodiment according to FIG. 3 the pole teeth again consist of radially disposed sheet metal elements 30. The magnetic return path is formed by the circular sheet metal elements 31. For the purpose of preventing the pole teeth from vibrating at their free ends, a ring 32 is provided having slits 33 in which the pole teeth engage, as shown in the figure. The bridges 34 between the slits of the ring, together with the surfaces 36 form the boundaries of the spherical gap of the machine. The free ends of the bridges have recesses 37 into which a ring 38 of magnetically non-conducting material is inserted, so that the free ends of the pole teeth 30 are supported radially outwardly and inwardly, as well as in azimuth by the ring 32.

FIGS. 4a and 4b show diagrammatic plan views of two different possible constructions, in which pole teeth consisting of radially directed sheet metal elements of progressively greater width in the radial direction can be produced by the use of sheet metal strips of equal thickness. In the embodiment shown in FIG. 4a, sheet metal strips 40 of larger radial length alternate with sheet metal strips 41 of smaller radial length, whilst in the representation shown in FIG. 4b the central sheet metal strips 50 are of greater radial length and the sheet metal strips 51 and 52 on either side thereof are of step-wise progressively lesser radial length.

I claim:

1. Stator for an electrical machine having a rotor where the stator has pole teeth extending parallel to the axis of the rotor which teeth are magnetically conductively interconnected at their ends facing away from the rotor and where the free ends of the teeth facing the rotor bound a part of an air gap with the rotor, characterized in that adjacent teeth are interconnected in the vicinity of their free ends by at least one magnetically non-conductive ring which surrounds the teeth to prevent their outwardly directed distortion and in that the teeth have axially extending recesses at their face ends into which a part of said ring is inserted to prevent their radially inward distortion.

2. Stator for an electrical machine having a rotor where the stator has pole teeth extending parallel to the axis of the rotor which teeth are magnetically conductively interconnected at their ends facing away from the rotor and where the free ends of the teeth facing the rotor bound a part of an air gap with the rotor, characterized in having a ring having slits connecting the teeth in the vicinity of their free ends such that the teeth are positioned in the slits whereby the surface of the ring between the teeth bounds a part of the air gap.

3. Stator according to claim 2, characterized in that, for the purpose of preventing the formation of eddy currents around each individual tooth, slits are provided in the ring, each of which extends from the periphery of the ring to the pole tooth concerned.

4. Stator for an electrical machine having a rotor where the stator ha pole teeth extending parallel to the axis of the rotor which teeth are magnetically conductively interconnected at their ends facing away from the rotor and where the free ends of the teeth facing the rotor bound a part of an air gap with the rotor, characterized in that said stator is built up from a plurality of radially disposed sheet metal strips, a plurality of sheet metal elements serving as a return path and a cap which surrounds said strips to prevent radially outward movement of said strips.

5. Stator according to claim 4 further characterized in that said strips forming a tooth have an equal thickness and have different widths extending in the radial direction.

6. Stator for an electrical machine having a rotor where the stator has pole teeth extending parallel to the axis of the rotor which teeth are magnetically conductively interconnected at their ends facing away from the rotor and where the free ends of the teeth facing the rotor bound a part of an air gap with the rotor, characterized in that adjacent teeth are interconnected in the vicinity of their face ends by at least one magnetically non-conductive ring which forms part of a housing surrounding the teeth to prevent their outwardly directed distortion and which also surrounds the ends of the teeth remote from the rotor, in that a spherical separating element is included in said air gap between the stator and rotor, in that a hollow body is arranged concentrically with and within the stator such that said housing, separating element and hollow body together form a hermetically sealed winding space.

7. Stator according to claim 6 further characterized in that said hollow body is formed to receive a support spindle for the rotor.

8. Stator for an electrical machine having a rotor where the stator has pole teeth extending parallel to the axis of the rotor which teeth are magnetically conductively interconnected at their ends facing away from the rotor and where the free ends of the teeth facing the rotor bound a part of a spherical air gap with the rotor, characterized in that adjacent teeth are interconnected in the vicinity of their free ends by engagement with a magnetically non-conductive holding means which surrounds the radial outer portions of the teeth to prevent outwardly directed distortion of said teeth.

9. Stator according to claim 8 further characterized in having a curved disc engaging a radial inner portion of all the said teeth to prevent radially inward distortion of said teeth and where said curved disc bounds a part of said spherical air gap.

10. Stator according to claim 8 further characterized in that the holding means comprises a part of a housing which surrounds said stator.

* * * * *